(12) United States Patent
Demoor et al.

(10) Patent No.: US 11,657,025 B2
(45) Date of Patent: May 23, 2023

(54) PARALLEL PROCESSING OF FILTERED TRANSACTION LOGS

(71) Applicant: Western Digital Technologies, Inc., San Jose, CA (US)

(72) Inventors: Thomas Demoor, Ghent (BE); Satish Kumar Chakka, Bangalore (IN); Viswanath Chandrasekara Bharathi, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 16/828,953

(22) Filed: Mar. 24, 2020

(65) Prior Publication Data

US 2020/0401562 A1 Dec. 24, 2020

Related U.S. Application Data

(60) Provisional application No. 62/865,880, filed on Jun. 24, 2019.

(51) Int. Cl.
*G06F 7/00* (2006.01)
*G06F 16/18* (2019.01)
*G06F 16/16* (2019.01)
*G06F 16/17* (2019.01)

(52) U.S. Cl.
CPC ........ *G06F 16/1865* (2019.01); *G06F 16/164* (2019.01); *G06F 16/1734* (2019.01); *G06F 16/1858* (2019.01)

(58) Field of Classification Search
CPC ............... G06F 16/1865; G06F 16/164; G06F 16/1858; G06F 16/1734
USPC .................................. 707/754, 822, 999.203
See application file for complete search history.

(56) References Cited

U.S. PATENT DOCUMENTS

| 8,301,593 | B2 | 10/2012 | Hoffmann et al. |
| 2010/0122053 | A1 | 5/2010 | Prahlad et al. |
| 2016/0173599 | A1* | 6/2016 | Chablani ................. G06F 3/067 709/217 |
| 2019/0028010 | A1 | 1/2019 | Zhu et al. |
| 2020/0125473 | A1* | 4/2020 | Kamran .............. G06F 11/2097 |
| 2020/0364239 | A1* | 11/2020 | Kumar ................ G06F 16/2282 |

OTHER PUBLICATIONS

International Search Report and Written Opinion of Application No. PCT/US2020/024762, dated Jul. 13, 2020 (10 pages).

* cited by examiner

*Primary Examiner* — Md I Uddin
(74) *Attorney, Agent, or Firm* — Patent Law Works LLP

(57) ABSTRACT

Example storage systems and methods provide data storage management using parallel processing of filtered transaction logs. Transaction logs are comprised of log entries corresponding to storage operations for at least one storage node. Sets of log entries are sequentially retrieved from the transaction log and filtered through multiple transaction log filters to generate multiple subsets of the log entries. Different metadata operations are executed in parallel using the different filtered subsets of log entries.

19 Claims, 8 Drawing Sheets

PARALLEL PROCESSING OF FILTERED TRANSACTION LOGS

TECHNICAL FIELD

The present disclosure generally relates to data storage systems using transaction logs to manage data operations. In a more particular non-limiting example, the present disclosure relates to processing transaction logs for metadata operations.

BACKGROUND

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smart phones, and tablets, allow a user to have access to a variety of useful applications nearly constantly. Using such applications results in the generation of an increasingly huge amount of data. Storing and retrieving the produced data efficiently is a significant challenge.

As the amount of data and rate of change of stored data increases, the ability to collect accurate and timely information about the stored data becomes both more important and more challenging. For example, storage system parameters, such as storage capacity, may change with every data storage transaction processed by a storage system and near real-time information on storage capacity may be desired for making storage allocation and other storage management decisions.

Some solutions use a metadata database (DB) or key value stores (KVSs) in a large-scale distributed storage system (DSS) to provide a scalable log to accommodate the current growth in data. These types of DSSs generally require that log data be maintained in the metadata DB or KVS with a minimal impact on the responsiveness of the metadata DB or KVS, including limiting the processing overhead for metadata operations, such as property logging, parameter calculation, notifications, and supporting data management tasks like replication, garbage collection, and data scrub. The DSS and/or metadata DB may use a metadata streamer to publish transaction logs to metadata operations.

As the number of metadata operations supported by the DSS increase, there may be an ongoing need for a metadata streamer configured to efficiently support multiple parallel metadata operations in a scalable way.

SUMMARY

Various aspects for transaction log management in distributed storage systems, particularly, using a novel metadata streamer configuration to support parallel processing of filtered transaction logs are described.

One general aspect includes a storage system that includes: at least one storage node configured to execute storage operations; a transaction log configured to store a plurality of log entries corresponding to storage operations for the at least one storage node; a first metadata streamer configured to sequentially retrieve a set of log entries from the transaction log; and a plurality of transaction log filters configured to selectively provide subsets of the set of log entries from the first metadata streamer to a plurality of metadata operations, where the metadata operations of the plurality of metadata operations are configured to operate in parallel on the subsets of the set of log entries.

Implementations may include one or more of the following features. The storage system may include a fanout socket configured to: receive the set of log entries from the first metadata streamer; replicate the set of log entries for each transaction log filter of the plurality of transaction log filters; and push a replicated set of log entries to each transaction log filter of the plurality of transaction log filters. The fanout socket may further include an expandable interface for interfacing with a variable number of transaction log filters, and the plurality of transaction log filters may include at least three pluggable transaction log filters. The storage system may include a plurality of additional metadata streamers configured to fetch log entries from the plurality of filtered transaction logs, where each transaction log filter of the plurality of transaction log filters corresponds to an assigned filtered transaction log from the plurality of filtered transaction logs. The storage system may include a plurality of additional metadata streamers, where each assigned filtered transaction log from the plurality of filtered transaction logs corresponds to an assigned metadata streamer from the plurality of additional metadata streamers. The plurality of metadata operations may be selected from one or more of: replication, notification, metadata indexing, garbage collection, data scrub, and parameter calculation. The storage system may include a reference counter configured to: track a processing number of metadata operations corresponding to the plurality of metadata operations; and release, responsive to completing the plurality of metadata operations, the subsets of the set of log entries from the first metadata streamer. The reference counter may be further configured to receive a completion notification from each metadata operation of the plurality of metadata operations. Each metadata operation of the plurality of metadata operations may be configured with an operation group, a selected operation group may include a plurality of synchronized metadata operations, and subsets of the set of log entries may be configured for release when each metadata operation for the selected operation group are all complete. Each transaction log filter of the plurality of transaction log filters may include: an operation type, an expiration condition, and at least one log entry selection criteria.

Another general aspect includes a computer-implemented method that includes: storing a transaction log comprised of a plurality of log entries corresponding to storage operations for at least one storage node; sequentially retrieving a set of log entries from the transaction log; selectively providing, using a first transaction log filter, a first subset of the set of log entries to a first metadata operation; selectively providing, using a second transaction log filter, a second subset of the set of log entries to a second metadata operation; and, executing in parallel, the first metadata operation on the first subset of the set of log entries, and the second metadata operation on the second subset of the set of log entries.

Implementations may include one or more of the following features. The computer-implemented method may include: replicating the set of log entries for the first transaction log filter and the second transaction log filter; pushing a first replicated set of log entries to the first transaction log filter; and pushing a second replicated set of log entries to the second transaction log filter. The computer-implemented method may include: adding a third transaction log filter for a third metadata operation; selectively providing, using the third transaction log filter, a third subset of the set of log entries to the third metadata operation; and executing, in parallel with the first metadata operation and the second metadata operation, the third metadata operation on the third subset of the set of log entries. The computer-implemented method may include: storing the first subset of the set of log entries in a first filtered transaction log; storing the second subset of the set of log entries in a second filtered transaction log; removing, responsive to completing the first metadata operation on the first subset, the first subset from the first filtered transaction log; and removing, responsive to completing the second metadata operation on the second subset, the second subset from the second filtered transaction log. The computer-implemented method may include: fetching, using a first metadata streamer, log entries from the first filtered transaction log; fetching, using a second metadata streamer, log entries from the second filtered transaction log; requesting, by the first metadata operation, log entries from the first filtered transaction log; and requesting, by the second metadata operation, log entries from the second filtered transaction log. The computer-implemented method may include: selecting the first metadata operation from a plurality of operation types including two or more of: replication, notification, metadata indexing, garbage collection, data scrub, and parameter calculation; and selecting the second metadata operation from the plurality of operation types, where the first metadata operation and the second metadata operation have different operation types from the plurality of operation types. The computer-implemented method may include: tracking a processing number of metadata operations for a plurality of metadata operations, where they plurality of metadata operations includes the first metadata operation and the second metadata operation; and releasing, responsive to the processing number of metadata operations completing, the set of log entries retrieved from the transaction log. The computer-implemented method may include: receiving a completion notification from each metadata operation of the plurality of metadata operations; and determining, responsive to receiving the completion notification from each metadata operation of the plurality of metadata operations, the processing number of metadata operations are complete. The computer-implemented method may include: determining a first expiration condition for the first transaction log filter; determining a second expiration condition for the second transaction log filter; and releasing, responsive to the first expiration condition and the second expiration condition being met, the set of log entries.

Another general aspect includes a system that includes: at least one storage node configured to execute storage operations; a transaction log may include of a plurality of log entries corresponding to storage operations for the at least one storage node; means for sequentially retrieving a set of log entries from the transaction log; means for selectively providing, using a first transaction log filter, a first subset of the set of log entries to a first metadata operation; means for selectively providing, using a second transaction log filter, a second subset of the set of log entries to a second metadata operation; and means for executing in parallel the first metadata operation on the first subset of the set of log entries and the second metadata operation on the second subset of the set of log entries.

The various embodiments advantageously apply the teachings of data storage systems to improve the functionality of such computer systems. The various embodiments include operations and data structures to overcome or at least reduce issues in the previous storage systems discussed above and, accordingly, are more reliable, efficient, and scalable than other computer data storage architectures for some applications. That is, the various embodiments disclosed herein include hardware and/or software with functionality to improve the efficiency and scalability of storage system transaction log processing to support metadata operations. Accordingly, the embodiments disclosed herein provide various improvements to storage systems.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
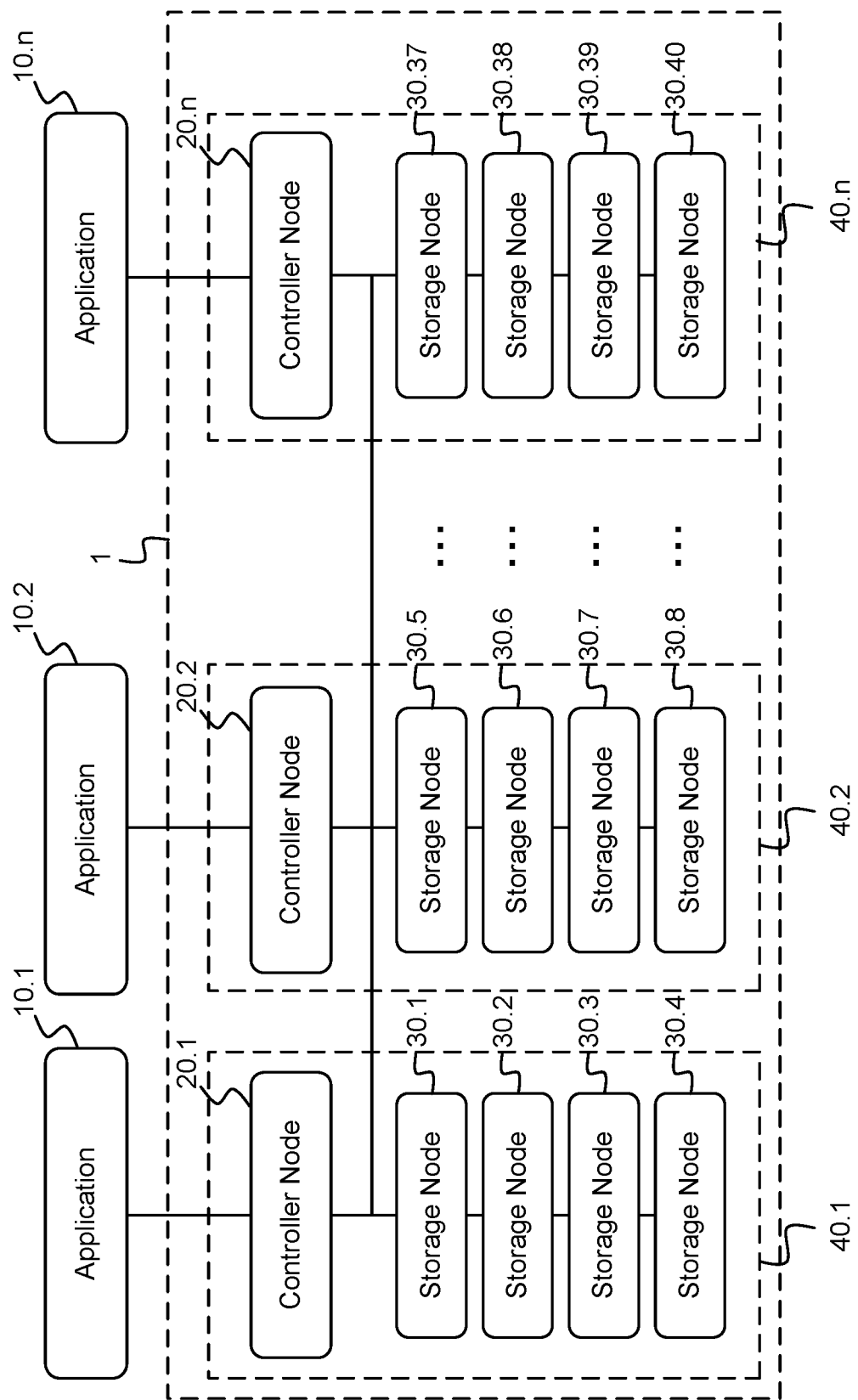
FIG. 1 schematically illustrates a distributed object storage system.

FIG. 1 shows an embodiment of an example object storage system 1. According to this embodiment the storage system 1 may be implemented as a distributed object storage system which is coupled to one or more applications 10 for transferring and otherwise accessing data objects. The connection between the storage system 1 and the application 10 could, for example, be implemented as a suitable data communication network. Such an application 10 could, for example, be a dedicated software application running on a computing device, such as a personal computer, a laptop, a wireless telephone, a personal digital assistant or any other type of communication device that is able to interface directly with the storage system 1. However, according to alternative embodiments, the application 10 could for example comprise a suitable file system which enables a general-purpose software application to interface with the distributed storage system 1, an application programming interface (API) library for the distributed storage system 1, etc.

As further shown in FIG. 1, the storage system 1 comprises at least one controller node 20 and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Controller nodes 20, storage nodes 30 and the devices hosting application 10 may connect to the data communication network by means of suitable wired, wireless, optical, etc. network connections or any suitable combination of such network connections. Although the embodiment of FIG. 1 shows three controller nodes 20 and forty storage nodes 30, according to alternative embodiments the distributed storage system 1 could comprise any other suitable number of storage nodes 30 and, for example, one, two, or more controller nodes 20 coupled to these storage nodes 30.

These controller nodes 20 and storage nodes 30 can be built as general-purpose computers, however more frequently they are physically adapted for arrangement in large data centers, where they are arranged in modular racks 40 comprising standard dimensions. Exemplary controller nodes 20 and storage nodes 30 may be dimensioned to take up a single unit of such rack 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary controller node 20 may comprise high-performance servers and provide network access to applications 10 over multiple high bandwidth Ethernet network interfaces. Data can be transferred between applications 10 and such a controller node 20 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 30. In some embodiments, HTTP/REST protocols complying with S3 may enable data transfer through a REST application protocol interfaces (API). Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centers, such as for example rack 40.1 can be located at a data center in Europe, 40.2 at a data center in the USA and 40.*n* at a data center in China.

Figure 2:
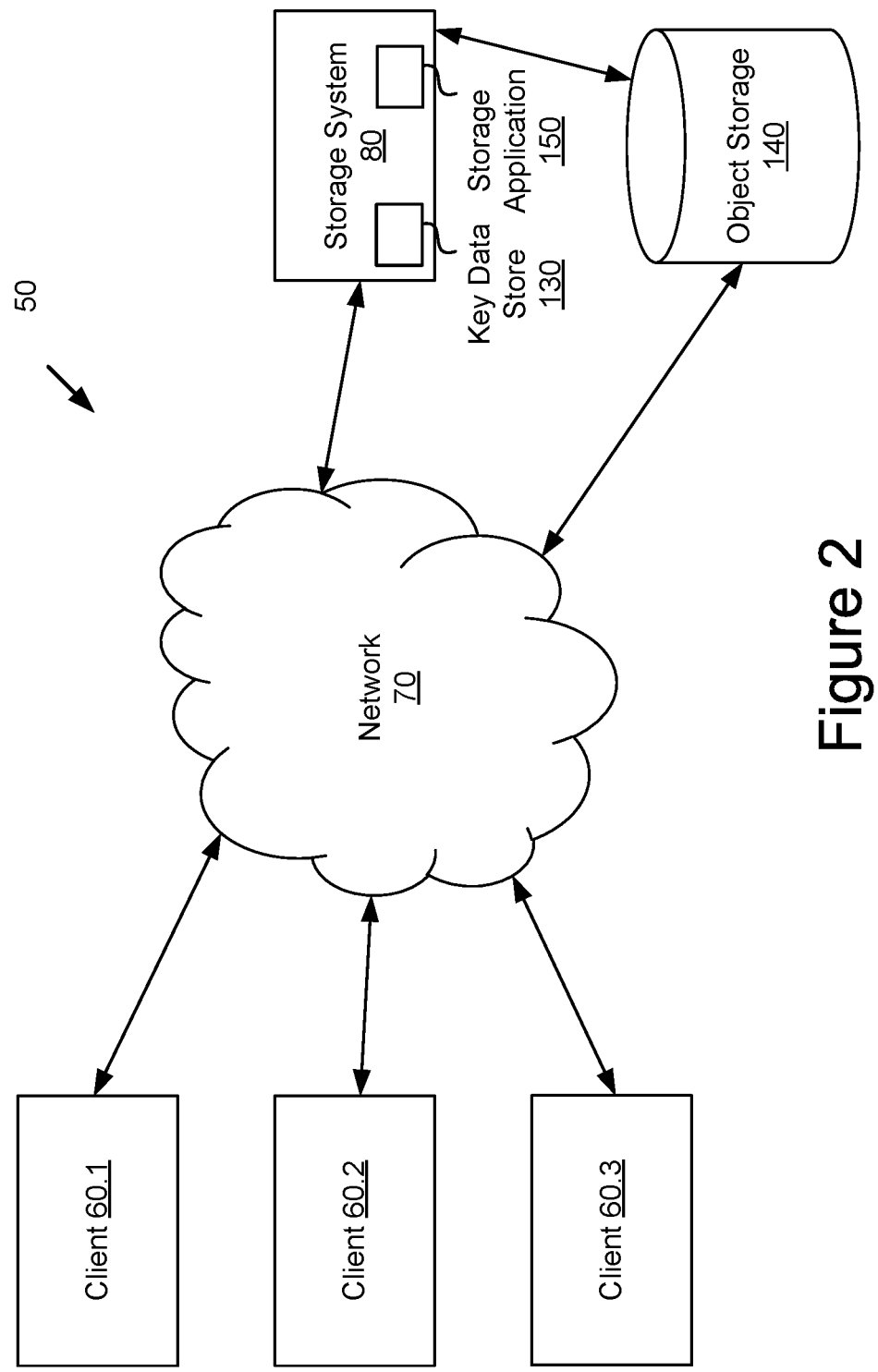
FIG. 2 schematically illustrates a client/server architecture that may be used by the distributed object storage system of FIG. 1.

FIG. 2 is a block diagram of an example storage system 80 using a client architecture 50. In some embodiments, storage system 1 may be embodied in such a storage system 80. As shown, storage system 80 can include multiple client devices 60 capable of being coupled to and in communication with a storage system 80 via a wired and/or wireless network 70, such as public and/or private computer networks in any number and/or configuration (e.g., the Internet, an intranet, a cloud network, etc.)). Client architecture 50, among other examples, may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications, such as application 10 in FIG. 1, to use or manage a distributed object storage system, such as storage system 1 in FIG. 1.

The metadata DB may be implemented as key data store 130 associated with storage application 150 in storage system 80. Storage system 80 may include or otherwise access object storage 140 for object storage and maintenance operations. Object storage 140, storage system 80, and/or components or subsystems thereof (including, for example, the components of storage system 1 in FIG. 1) may be interconnected by network 70.

Network 70 may include any number of private and public computer networks. Network 70 may include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 70 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (short message service (SMS), multimedia message service (MMS), extensible message service (XMS), Internet message access protocol (IMAP), simple mail transfer protocol (SMTP), post office protocol (POP), web distributed authoring and versioning (WebDAV), etc.), or other suitable protocols.

Client devices 60, storage system 80, and/or object storage 140 may send/receive requests and/or send/receive responses, such as but not limited to HTTP(S) requests/responses, to/from one another. Client devices 60 may present information, such as visual, audio, tactile, and/or other information via output devices, such as displays, audio reproduction devices, vibration mechanism, etc., based on information generated by client devices 60 and/or received from storage system 80. Users may interact with various client devices 60 to provide input and receive information.

Object storage requests may include information describing the object being updated, such as a file name or global universal identifier (GUID), the data comprising the updates, a client identifier, an operation type, etc., and storage application 150 may use that information to record the updates in one or more transaction logs, as described herein. In another example, a client application (e.g., an application 10 executing on a client device 60) may request an object or portion thereof, a list of objects matching certain criteria, etc., in which case the request may include corresponding information (e.g., an object identifier, search criteria (e.g., time/date, keywords, etc.)), and receive an object list or the object itself from storage application 150. Numerous other use cases are also applicable and contemplated.

Storage system 80 may include storage application 150 and may be coupled to and/or include key data store 130. Storage application 150 may include components that perform various tasks, as discussed with reference to at least FIG. 4. Storage application 150, and/or its components, may be coupled for communication to one another and other components of the system, such as key data store 130, the object storage 140, application 10 executing on a client device 60, etc.

Storage application 150 may provide an object storage service, manage data storage using key data store 130 (as a metadata DB) and the object storage 240 (e.g., store, retrieve, and/or other manipulate data in key data store 130, retrieve data objects from the object storage 140, etc.), process requests received from various entities (e.g., client devices 60, etc.), provide for lock-free concurrency, perform garbage collection, and perform other operations, as discussed further herein. Storage application 150 may include various interfaces, such software and/or hardware interfaces (e.g., application programming interface(s) (API(s)), that may be accessed (e.g., locally, remotely, etc.) by components of the storage system 1, such as various client applications 10, the third-party applications, etc.

In some embodiments, storage application 150 may be a distributed application that is implemented in two or more computing systems. In some embodiments, the object storage 140 may comprise a plurality of storage devices, servers, software applications, and other components, such as but not limited to any suitable enterprise data grade storage hardware and software. Similarly, it should be understood that key data store 130 may be distributed across two or more computing systems, such as sharded across a plurality of server systems. In some embodiments, storage application 150 may be a local application receiving local and/or remote storage requests from other clients (e.g., local applications, remote applications, etc.).

Key data store 130 may comprise a database that stores an ordered set of object key entries, as discussed in further detail elsewhere herein. In some embodiments, the key data store 130 may comprise a horizontally partitioned database having two or more shards, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Thus, depending on the configuration, database shards may be implemented on different physical storage devices, as virtual partitions on the same physical storage device, or as any combination thereof.

Object storage 140 may comprise one or more data stores for storing data objects. Object store 140 may be implemented across a plurality of physical storage devices. In some example embodiments, the plurality of physical storage devices may be located at disparate locations. For example, the one or more data stores may be implemented in a plurality of storage nodes, such as rack-based storage nodes, each storage node including a plurality of physical storage devices, and interconnected through controller nodes at various locations as described above with regard to FIG. 1. Objects stored in object storage 140 may be referenced by object key entries stored in key data store 130. In some example embodiments, multiple copies of a given object or portions thereof (e.g., erasure-encoded copies) can be stored at different physical storage devices to protect against data loss through system failure or to have the object quickly accessible from different geographic locations.

Key data store 130 and/or the object storage 140 may include one or more non-transitory computer-readable mediums (e.g., such as those discussed with reference to the memor(ies) 404 in FIG. 4) for storing the data. In some implementations, key data store 130 and/or the object storage 140 may be incorporated with the memor(ies) 404 or may be distinct therefrom. In some implementations, key data store 130 and/or object storage 140 may store data associated with a database management system (DBMS), such as one comprised by and/or controlled by the storage application 150 (e.g., key data store controller 420, storage service 422, etc., see FIG. 4) and/or other components of storage system 80. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that client architecture 50 illustrated in FIG. 2 and the distributed object storage system in FIG. 1 are representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the storage systems 1 and client architecture 50 may be integrated into a single computing device or system or additional computing devices or systems, etc.

The present disclosure describes a novel metadata streamer and filtering technology, which may include methods, systems, apparatuses, computer program products, and other aspects, that utilizes a transaction log stored in a key data store (e.g., database, key-value store (KVS), etc.) or other metadata DB. The technology is advantageously scalable and efficient for improving distributed data storage system operations.

As a non-limiting overview, the technology provides data storage management using parallel processing of filtered transaction logs. Transaction logs are comprised of log entries corresponding to storage operations for at least one storage node. Sets of log entries are sequentially retrieved from the transaction log, such as using a metadata streamer, and filtered through multiple transaction log filters to generate multiple subsets of the log entries. Different metadata operations are executed in parallel using the different filtered subsets of log entries.

Figures 3A, 3B:
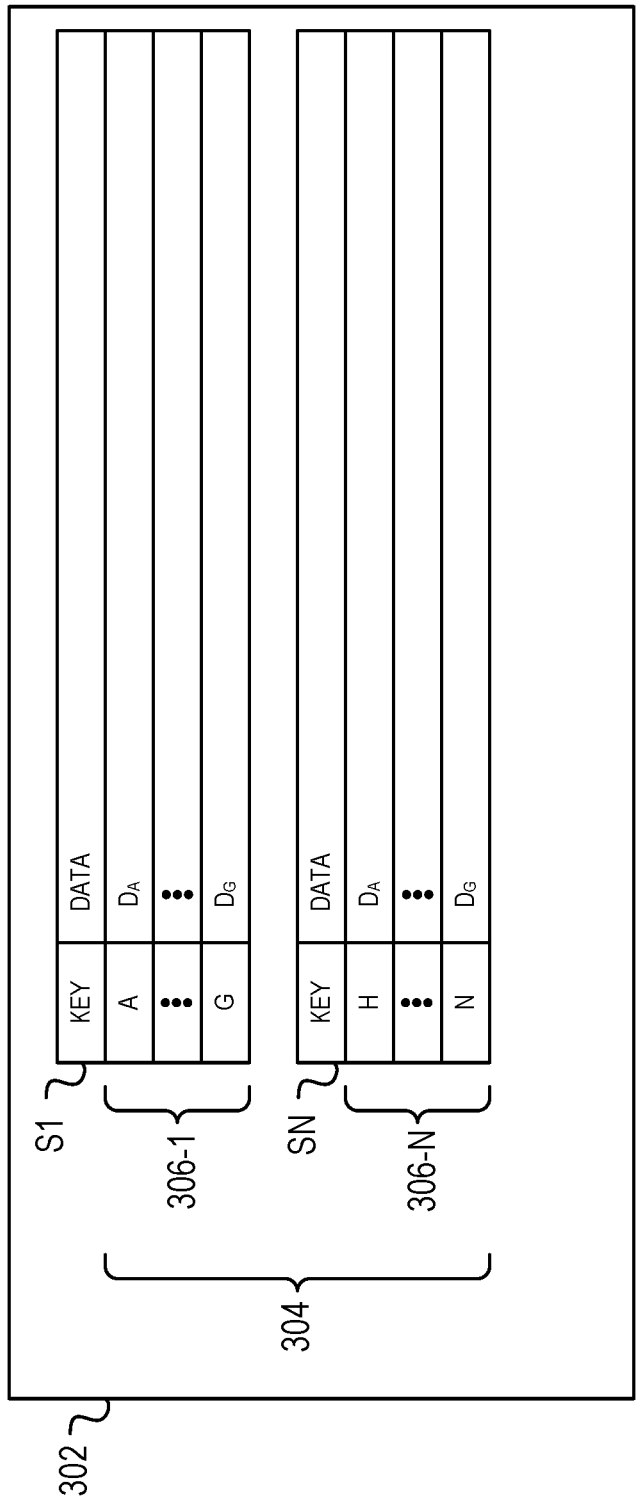
FIG. 3A is a diagram illustrating an example key data store.
FIG. 3B is a diagram of an example object key naming structure.

FIG. 3A is a diagram illustrating an example key data store 302, which comprises a plurality of shards S1 . . . SN.

While two shards S1 and SN are shown, it should be understood that any suitable number of shards may be included. Each shard stores an ordered subset of object key entries. For example, shard S1 is shown as storing the subset of object key entries 306-1 (e.g., keys A-G) and shard SN is shown as storing the subset of object key entries 306-N (e.g., keys H-N). The subsets 306-1 through 306-N comprise the ordered set of object key entries 304.

Further, as shown in FIG. 3A, each key (e.g., A . . . N, etc.) can correspond to a data instance (e.g., $D_A$ . . . $D_N$). The data instance may comprise a pointer to a location where the actual object data is stored (e.g., in a separate database, on a physical drive, etc.), or other suitable data values. Each key may correspond to a particular object. Further, various subsets of object key entries may correspond to the same object at different points in time. In such a configuration, an ordered set of object key entries can be stored across shards that can be efficiently searched. Further, storage of the actual data may be performed in accordance with various considerations such as data location, availability, and cost.

In some embodiments, key entries 306-1, 306-N may include a log set of entries that define a log that may be traversed to determine the state of one or more data properties and/or determine one or more data storage parameters. The log may include a set of key entries corresponding to various storage operations that impact a selected property or properties. For example, each data instance (e.g., $D_A$ . . . $D_N$) may include precondition and postcondition values for one or more properties from which change values for the properties may be determined. In some embodiments, key data store 302 may include a plurality of concurrent logs for different properties and/or log entries interleaved with other key entries.

In some embodiments, log entries may not be stored with the key entries in the key value store database, but in a separate transaction log. For example, a separate transaction log ordered by timestamp may be maintained as a separate database or similar data structure. The latest changes to the metadata database may be accessed and iterated from the transaction log based on timestamp without requiring a full database scan. In the case of multiple operations on the same key, the transaction log database may be smaller than the set of all logs and may include only the latest entry for any given key.

In some embodiments, a key (also referred to as an object key) may be generated using an object key naming structure. FIG. 3B is a diagram of an example object key naming structure 320. As shown, a key may comprise a combination of a plurality of key components, such as, but not limited to, an object identifier and a time value, such as a timestamp, inverse timestamp, logical timestamp, clock or counter value, etc. More particularly, as shown, example components include a prefix 322, an object ID 324, a suffix 326, and a type 328, although it should be understood that other dimensions are possible and contemplated, and could vary based on implementation.

Prefix 322 may comprise an identifier for identifying a group of object key entries from the ordered set of object key entries that are logically related. For example, the prefix may include a domain identifier, a bucket identifier, a client identifier, or any suitable combination thereof. In this way, a given client's object keys can be grouped together. Any suitable number of prefixes may be included in an object key.

Object identifier (ID) 324 may comprise a unique identifier for the object to which the key corresponds, such as an object name. An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

Suffix 326 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value). As time passes, the value of the inverse timestamp generally decreases. As such, two subsequent operations associated with the same object are recorded in the key data store in inverse order, with the most-recent operation being represented first (ahead of the less recent operation). Ordering may be achieved through a variety of values and operations, including an inverse timestamp, sequential counter value, negative logical clock, or any other monotonically decreasing number or ordered value.

Additional suffix(es) may be appended, such as, but not limited to, an operation type, such as type 328. Type 328 may comprise an identifier of the type of object storage operation that is represented by the object key. In some embodiments, a given operation may be denoted by a corresponding value, such as, but not limited to, unique character or character string, and type 328 may include that value. Example object storage operations include read, write, delete, update, etc. As a further example, write and update operations may be represented by a given identifier (e.g., "W"), a delete operation may be represented a given identifier (e.g., "K), etc., and so forth. While in some example embodiments, write and update operations may be recorded as the same type of operation, in further embodiments they may be differentiated.

Figure 4:
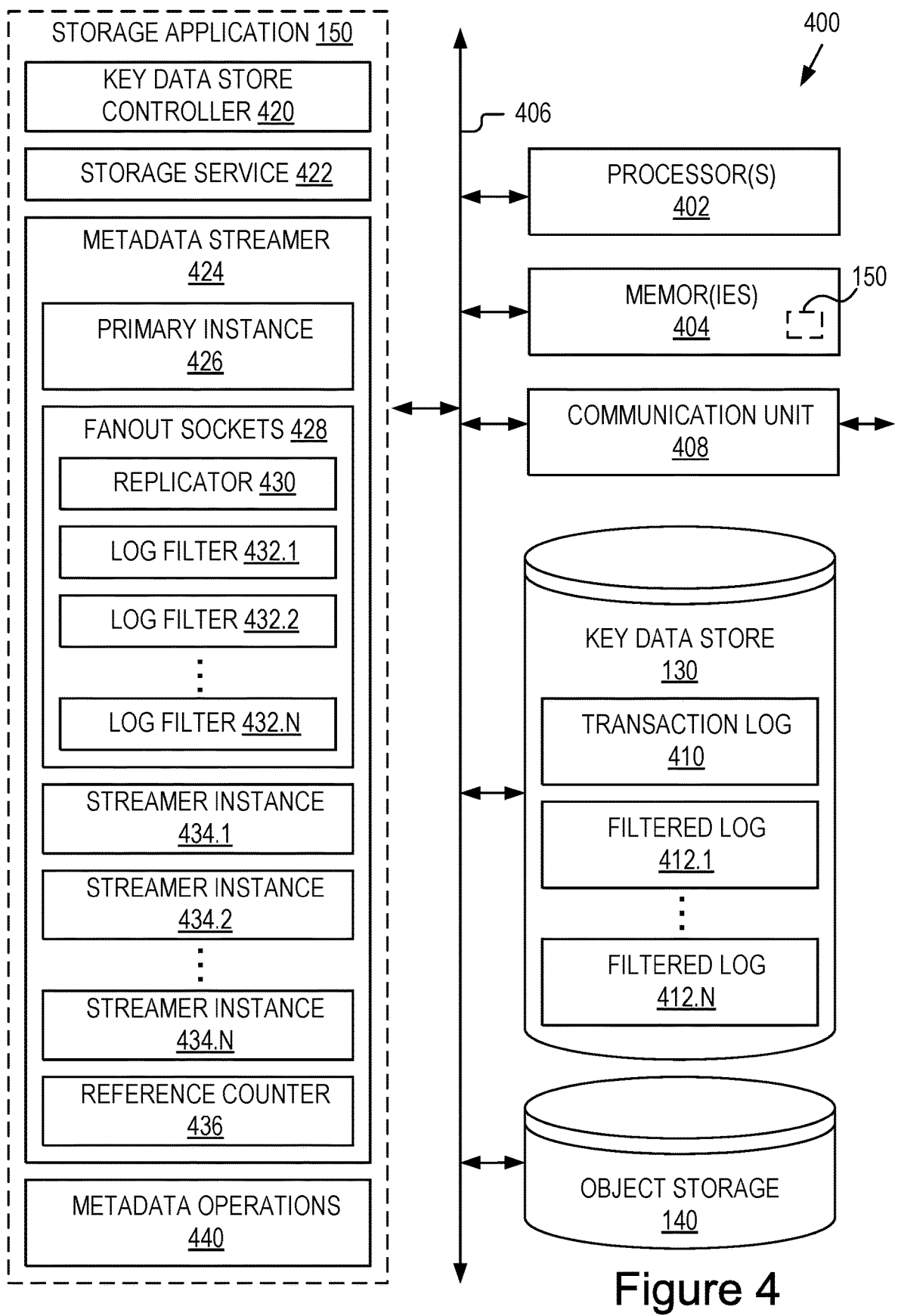
FIG. 4 is a block diagram of an example computing system.

FIG. 4 is a block diagram of an example computing system 400. In some embodiments, computing system 400 may represent a server instance or collection of instances, such as storage system 80. In some embodiments, computing system 400 may reflect other computing systems, such as a client devices 60, controller nodes 20, storage nodes 30, etc. Computing system 400 may comprise and/or be coupled to one or more processors 402, one or more memories 404, one or more communication units 408, a key data store 130, and an object storage 140. Computing system 400 further includes an instance of storage application 150. The components of computing system 400 can be communicatively coupled by a bus 406. In some embodiments, key data store 130 and/or object storage 140 may be implemented in a separate computing system and may be coupled to computing system 400 via communication unit 408. In some embodiments, storage application 150, or aspects thereof, may be implemented in the separate computing system (e.g., as a distributed or local application, etc.)

As shown in FIG. 4, storage application 150 includes key data store controller 420, storage service 422, metadata streamer 424, and metadata operations 440, although it should be understood that the depicted storage application 150 architecture is provided by way of illustration, and that storage application 150 may include other components and/or include other component hierarchies, and/or that the foregoing components and/or their acts and/or functionality may be combined or segmented into further components, etc.

Storage application 150, and/or its sub-components, such as, but not limited to, key data store controller 420, storage service 422, metadata streamer 424, and metadata operations 440 may be implemented in hardware and/or software. For instance, storage application 150, and/or one or more of its sub-components, may include hardware and/or software logic executable by the computing system 400. In some embodiments, storage application 150, and/or one or more of its sub-components, may comprise sets of instructions executable by processor(s) 402 to provide their functionality. In some embodiments, storage application 150, and/or one or more of its sub-components, are stored in memor(ies) 404 of computing system 400 and are accessible and executable by processor(s) 402 to provide their functionality. In any of the foregoing implementations, storage application 150, and/or one or more of its sub-components, may be adapted for cooperation and communication with processor(s) 402 and other components of computing system 400.

In further implementations, storage application 150, and/or one or more of its sub-components, may include specially configured software stored in memor(ies) 404 and executable by processor(s) 402 so as to configure processor(s) 402. In some embodiments, storage application 150, and/or one or more of its sub-components, may include logic gates, switches, application specific integrated circuitry (ASIC), a programmable logic controller, an embedded microcontroller, and/or other suitable hardware, etc. In further embodiments, storage application 150, and/or one or more of its sub-components, may include both hardware and software aspects. Numerous further variations are also possible and contemplated.

It should be appreciated that computing system 400 may represent a single computing system, a plurality of computing systems connected over a wide geographic area, a server cluster, or other suitable computing configurations. Thus, while the structure, acts, and functionality of computing system 400 may be described in the singular for clarity, it should be understood that the description is applicable to and includes more simple or complex computing infrastructure.

Key data store controller 420 comprises logic executable to manage the key data store 130. For instance, the key data store controller 420 maintains the integrity of the ordered set of object key entries, generates new object keys, stores new entries, retrieves existing entries, and manages concurrency, etc.

Key data store controller 420 can maintain the entries stored in the key data store 130 as an ordered set of object key entries. As discussed elsewhere herein, such as with reference to FIG. 3A-3B, the ordered set of object key entries may first group the entries using at least an object identifier component of the key, and then group the entries corresponding to each name in order of most-recent to least recent using an inverse time component of each of the keys. Using the ordered set of object key entries, prior key data entries and subsequent key data entries may be identified. Additionally, entries may further be grouped in the ordered set of object key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, and so forth.

In some example embodiments, keys may comprise alphanumeric character strings that include letters, numbers, and/or symbols (character symbols, punctuation, mathematical symbols, etc.), in which case the ordered set of object key entries may be sorted alphanumerically. For instance, a key may be first because the inverse timestamp of 80 comprising a portion of the character string of that key is lower than the inverse timestamp of 90 comprising a portion of the character string of the subsequent key of the next entry. However, it should be understood that configurations that reverse the sorting order and the inverse timestamps to achieve an objective equivalent to that as the ordered set of object key entries are encompassed hereby. Further, the keys may comprise other suitable constructs (e.g., encoded, compressed, etc.) that can be sorted in an analogous manner.

Key data store controller 420 may store entries in the key data store 130 as a transaction log 410 reflecting data manipulation or storage operations performed on objects (e.g., read, modify, write, etc.). In some embodiments, storage operations generating entries in transaction log 410 and performed on an object may include or trigger changes in one or more object properties, such as object size, and the entries in key data store 130 may include storage property values, including precondition values and postcondition values. Entries storing property change values may define a log set of key entries for one or more properties, objects, or other logical grouping of log entries. Entries may be stored responsive to object storage requests received by the storage service 422, such as but not limited to, put, get, delete, list, etc. Storage service 422 may be coupled to key data store controller 420 to instruct the key data store controller 420 to record the data storage operations in transaction log 410. For example and not limitation, in a software embodiment, storage service 422 can call corresponding methods of key data store controller 420 configured to perform the various functions and acts described herein. An instruction received form storage service 422 may comprise a new key entry request that includes components for generating the key, and in some embodiments, data corresponding to the key and/or properties related to the storage operation and/or data object.

By way of example, when recording a write, update, delete, etc., operation, the key entry request received from storage service 422 may include key-related data for generating the key, and a corresponding data instance (e.g., data value) for storage in association with the key. Responsive to receiving the storage instruction from storage service 422, key data store controller 420 computes an inverse timestamp using the key-related data, generates the key using the inverse timestamp, the object identifier, etc. (e.g., a prefix, an operation type, etc.), and stores a new, resulting key data entry comprising the generated key and the data instance in order of recency, as described elsewhere herein. In some embodiments, the data value may include precondition and postcondition values for one or more storage properties.

Continuing the foregoing example, key data store controller 420 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by key data store controller 420 (e.g., using a clock of the local system, issuing a call to the operating system, etc.). For instance, the object storage request received and processed by storage service 422 includes a timestamp determined by the requesting computing system upon which the request was initiated (e.g., a client device 60, storage system 80, etc.). In this case, the local operation timestamp may reflect the point in time in which the object storage operation was initiated (e.g., based on a clock of that system). In another example, key data store controller 420 assigns a timestamp to a requested object storage request based on the clock at the server system hosting storage application 150. Other suitable variations may also apply.

In the foregoing example, the new entry is situated first for that object (relative to other existing entries) in the ordered set of object key entries since it is the most recent based on the inverse timestamp. However, as further operations are performed on the object, as discussed elsewhere herein, corresponding further entries are added to key data store 130 and the foregoing new entry becomes less recent. This advantageously allows for scalable and flexible versioning of a data object.

An operation type component included in the key generated by key data store controller 420 may reflect the operation performed on the object, and may be used to record the lifecycle of the object over time (when it was initially created, modified, deleted, etc.).

As another example, when performing a read operation (e.g., responsive to receipt of a list request), the instruction data received from storage service 422 may include key-related search terms that are used for querying key data store 130. For example, the search term(s) may comprise an object identifier or portion thereof, and key data store controller 420 may query the ordered set of object key entries in key data store 130 based on it and return a corresponding result set. Additional or alternative search term(s) may include, but are not limited to, data describing a domain, bucket, timestamp, operation type, etc., and key data store controller 420 may query the ordered set of object key entries in key data store 130 based on them and return a corresponding result set.

In some cases, the result set may be ordered in inverse order beginning with the most-recent entry first and the oldest entry last, which mirrors the order in the ordered set of object key entries of key data store 130, although the result set could be ordered in other ways depending on implementation.

In some embodiments, further key components may be included in the instruction from storage service 422 so the result set may be refined (e.g., limited to a certain client and/or operation type, etc.). In some cases, the most-recent entry for a particular object reflecting the most-recent data manipulation operation may be requested, in which case the result set may include a single result. Other variations are also possible and contemplated.

In some embodiments, transaction log 410 may not be stored as key value entries in key data store 130, but as a separate database ordered by timestamp. Periodically, a new database shapshot may be taken. For example, the current set of log entries in transaction log 410 may be combined with a previous snapshot to provide a record of log entries. After the set of log entries is added to the snapshot or similar backup record, the current set of log entries may be discarded and a next set of entries may be generated for the transaction log going forward, keeping the size of the active transaction log entries low. In some embodiments, the operation of metadata streamer 424 may be coordinated with the release or discarding of entries in transaction log 410 to assure that metadata streamer 424 has the opportunity to process all entries that pass through transaction log 410. For example, key data store controller 420 may be configured not to release entries from transaction log 410 until metadata streamer 424 has acknowledged processing those log entries.

Storage service 422 comprises computer logic executable to process object storage requests. Storage service 422 may receive requests from local applications and/or remote applications. An application that sends storage requests to storage application 150 is referred to herein as a client application. Storage service 422 can process the requests and transmit corresponding responses, which may include confirmation data confirming a successful execution of a storage operation, response data reflect results of a query-based request, and/or error information reflecting any errors that were encountered, etc. In further embodiments, the functionality of storage service 422 may be included in key data store controller 420, in which case key data store controller 420 may receive and process the object storage requests.

In some embodiments, storage service 422 may include a request handler that receives and parses object storage requests from client applications, such as a client application operating on various client devices 60, server systems, etc. As discussed elsewhere herein, the request may include any data necessary for executing the request, such as data for generating a new object key entry (e.g., key components, data value (e.g., an address, such as a link, pointer, reference, unique identifier, etc.)), data for querying entries based on the key (e.g., search terms, key components, etc.), object data to be stored in the object storage 140 (e.g., comprising a new object, modification to the object, object metadata describing the object, updates, etc.), one or more property types and property values, including precondition and postcondition values, etc. Storage service 422 may parse the data from the request and process it accordingly.

For example, responsive to receiving a request, the storage service may implement the requested object storage operations in object storage 140. For example, storage service 422 may read, write, update, and/or otherwise manipulate objects in object storage 140 based on parameters of the request. For instance, if the request is a write request that stores a new object to object storage 140, storage service 422 may write the new object to object storage 140.

Storage service 422 may interact with the key data store controller 420 to store and retrieve data from key data store 130. To do so, in some cases, storage service 422 can issue various instructions to key data store controller 420, such as but not limited to instructions comprising put, get, delete, list, request, etc.

In some embodiments, in conjunction with the implementation of an object storage operation, storage service 422 may request that key data store controller 420 store a new entry reflecting the operation responsive to receiving the object storage request from a client. As discussed elsewhere herein, each ticket/entry stored in key data store 130 may be associated with an object storage operation performed at a particular point in time in association with an object in object storage 140.

By way of further example and not limitation, storage service 422 may request that key data store controller 420 store an entry in key data store 130 that corresponds with an operation being performed on a corresponding object in object storage 140. For instance, in association with writing a new object to object storage 140, storage service 422 may request that key data store controller 420 store a new entry comprising a corresponding object key (that includes the object identifier, inverse timestamp, etc.) and object reference in key data store 130. Alternatively, when an object is deleted from object storage 140, storage service 422 can request that key data store controller 420 store an entry in key data store 130 reflecting deletion of that object, as discussed elsewhere herein. In association with that instruction, storage service 422 may or may not delete some or all instances of the object data from object storage 140 depending on the data retention protocol.

In some embodiments, the storage service may instruct key data store controller 420 to query key data store 130 for one or more entries matching query criteria included in the request. For instance, responsive to receiving the request, key data store controller 420 may query the operations associated with a particular object by querying key data store 130 for the ordered keys associated with the object (e.g., using the object identifier, etc.), and return a result set to storage service 422 for provision to the requester. Storage service 422 may be coupled to key data store controller 420, and interact with key data store controller 420 to store and retrieve data from key data store 130.

Metadata streamer 424 comprises logic executable to retrieve, replay, or stream sequential entries in transaction log 410 in key data store 130 for use in various metadata operations 440. For example, metadata streamer 424 may be configured to retrieve or fetch sets of log entries from key data store 130 as they are added in order to make them available to a consumer, such as a specific metadata operation from metadata operations 440. In some embodiments, metadata streamer 424 retrieves log entries from a distributed queue that represents the tail entries (new log entries since transaction log 410 was last cleared) in response to a request from a consumer. For example, a particular metadata operation may request a next set of transaction log entries from metadata streamer 424 and metadata streamer 424 may read the relevant set of transaction logs (such as the set of entries from a particular timestamp to the most recent entry) and provide them to the requesting consumer. After processing the set of transaction log entries, the consumer may inform the metadata streamer that the set of entries has been processed and metadata streamer 424 may remove the set of entries from the distributed queue. In some configurations, metadata streamer 424 manages the distributed queue as a temporary transaction log 410 based on a subset of the total transaction log entries present in key data store 130 to support a single consumer. However, as discussed above, this may be problematic as the number of consumers among metadata operations 440 increases and serial processing of transaction log entries through metadata streamer 424 becomes impractical.

Metadata streamer 424 may be coupled to key data store controller 420, and interact with key data store controller 420 to retrieve data from transaction log 410 in key data store 130. Metadata streamer 424 may be coupled to storage service 422 and metadata operations 440, and interact with storage service 422 and metadata operations 440 to support a variety of metadata operations, including metadata operations supporting storage service 422, as well as other management, maintenance, or application-related metadata operations. In some embodiments, metadata streamer 424 may include a primary instance 426, fanout sockets 428, a plurality of filtered streamer instances 434, and a reference counter 436.

Primary instance 426 of metadata streamer 424 may include logic, functions, and/or parameters for queuing transaction log entries for further processing by the other components of metadata streamer 424. From the perspective of key value store 130, primary instance 426 may be configured as a standalone metadata streamer instance that populates transaction log 410 and manages availability of entries in transaction log 410 to a plurality of downstream consumers through fanout sockets 428. In some embodiments, primary instance 426 may operate similarly to the description the single consumer case for metadata streamer 424 with fanout sockets 428 as the consumer and reference counter 436 managing when the entries in transaction log 410 may be released. In some embodiments, primary instance 426 may request, receive, or otherwise access entries in key data store 130 through a distributed queue populated with a set of transaction log entries that may correspond to a moving window of the total log entries in key data store 130. At any operating moment, transaction log 410 may be populated with a set of recent transaction log entries spanning a variable operating period and managed by primary instance 426 of metadata streamer 424.

Fanout sockets 428 may include logic, functions, parameters, and/or data structures for managing a plurality of log filters for generating filtered subsets (e.g. filtered logs 412.1-412.N) of transaction log 410 for parallel processing by a variety of consumers. For example, fanout sockets 428 may define an expandable interface for engaging a plurality of log filters 432.1-432.N matched to a plurality of consumer use cases that may be executed in parallel. Fanout sockets 428 may be configured to provide selective access to the log entries of transaction log 410 and allow each consumer to operate on the relevant log entries in parallel but at independent rates. In some embodiments, fanout sockets 428 may include a replicator 430 and a plurality of log filters 432.1-432.N.

Replicator 430 may enable fanout sockets 428 to support any number of log filters 432 by replicating transaction log 410 or selected entries thereof for processing through log filters 432 and their associated consumers. For example, fanout sockets 428 may maintain a count of the number of active log filters 432, read transaction log 410, and generate a number of copies equal to the number of active log filters 432. In some embodiments, replicator 430 may include selective replication where a log range is maintained or received for each log filter 432 and replicator 430 only replicates the log entries within the log range for use by a particular log filter 432. For example, replicator 430 may receive a terminal timestamp for log filters 432 that do not necessarily need the entire current transaction log 410. Terminal timestamps may be generated by the last log entry processed by the log filter and/or related consumer or a timestamp range of interest defined by the consumer. In some embodiments, replicator 430 generates a series of data structures to store replicated copies of transaction log 410 in memory 404. In some embodiments, replicator 430 may employ virtual replication and use pointers assigned to each log filter 432 to indicate processing positions in transaction log 410.

Log filters 432 may each define a unique subset of transaction log 410 to be processed by their associated consumer, such as selected metadata operations from metadata operations 440. For example, each transaction log filter 432 may be embodied in a data structure, set of parameters, or function that defines the operation of that log filter, the subset of log entries it will store in filtered logs 412, and the conditions for releasing the current entries in transaction log 410. In some embodiments, each log filter may include an operation type, an expiration condition, and at least one log entry selection criteria. For example, operation type may include a type identifier corresponding to the consumer metadata operation, such as replication, notification, indexing, parameter calculation, garbage collection, data scrub, or similar operations that process operation log entries to generate results. The expiration condition may include parameters to define when the consumer metadata operation completes operations on the filtered log and the filtered log may be released, such as awaiting a notification from the metadata operation, allowing a certain operating time to elapse, monitoring a progress indicator (e.g., the filtered log may be released when the progress indicator reaches the log entry with timestamp value X), monitoring a message stack or buffer space for the consumer to prevent overflow, etc. Log entry selection criteria may include an open criteria that receives a complete duplicate of the current transaction log, time-based filtering (e.g. a range of timestamps), and/or any filtering criteria based on any value contained in the log entries. As discussed with regard to FIG. 3B, log entries (i.e. key data entries) may include prefix values, object identifiers, timestamps, types, and other parameters that may be used to filter and select for desired log entries. For example, some metadata operations may only operate on write operation entries, operation entries related to a specific object, operation entries on objects belonging to a specific owner or bucket. etc.

In some embodiments, log filters 432 may be grouped into operation groups that may include some form of dependency or coordination among the corresponding consumers. For example, several operations may include some level of synchronized metadata operations, where each metadata operation must be operating on the same transaction log set or subset at the same time. For example, some parameter calculations may need to process operation logs to the same timestamp to provide valid calculations, such as storage space allocations among different buckets or owners on a metered storage system. In some embodiments, an operation group may be defined with an operating dependency on another operation group, such parameter calculations or data scrubs that should not operate ahead of garbage collection.

In some embodiments, metadata streamer 424 may include a plurality of additional streamer instances 434 corresponding to each log filter 432 to provide log entries from filtered logs 412 to the respective consumers. For example, fanout sockets 428 may provide a log processing path from transaction log 410 through a plurality of distinct and dedicated parallel paths, where each path includes a log filter 432 to a filtered transaction log 410 to a metadata streamer instance 434 to the consumer metadata operation. Metadata streamer instances 434 may operate similarly to primary instance 426, except that they target the queues of filtered logs 412, rather than the distributed queue of transaction log 410. The additional streamer instances 434 may enable compatibility with previously defined metadata operations configured for an interface with a conventional metadata streamer. In some embodiments, metadata streamer instances 434 may each receive notification of metadata operation completion from their respective consumers and, in turn, request the next set of entries from transaction log 410 through fanout sockets 428. This may allow each metadata streamer 424 to operate independently and process transaction logs at a different pace, without the need for offset management and/or reference counting. Fanout sockets 428 maintains the independent queues for each streamer instance 434 in filtered logs 412 and may manage the log entry range, duration, and contents to match the specific needs of the consumer independent of the requirements of the other consumers.

Reference counter 436 may include logic, functions, parameters, and/or data structures for managing parallel consumers for primary instance 426 by identifying a number of log filters and related consumers and tracking the progress of each through the current set of log entries in transaction log 410. For example, reference counter 436 may be configured to maintain a reference count value on a set of transaction log entries. In some embodiments, the reference count value may be initialized with a number of consumers or metadata operations that are enabled on fanout sockets 428. The reference count may then be decremented when a metadata operation completes and reference counter 436 is notified that the set of transaction logs is not longer needed by that consumer. When the reference count value reaches zero, all metadata operations have completed on that set of transaction log entries (or the filtered subsets relevant to those consumers) and the primary instance 426 of metadata streamer 424 discards or releases the current set of transaction log entries.

In some embodiments, reference counter 436 may also provide offset management for each metadata operation or consumer, including synchronized operation groups if enabled. For example, each metadata operation or synchronized group of metadata operations may receive a unique identifier registered with reference counter 436. Each metadata operation or group may have an associated offset value maintained by reference counter 436 to support progress tracking and release of transaction log entries that are not longer needed.

Metadata operations 440 may include components, functions, processes, and services that rely on processing queues of transaction log entries to complete storage, maintenance, management, and/or data processing operations related to object storage 140. For example, metadata operations may include replication, notification, indexing, parameter collection, garbage collection, data scrub, and other operations. Each of these operations may target a set (or subset) of log entries from key data store 130 for processing and sequentially evaluate entry contents to complete their operations. Note that many of these processes are continuous and are updated constantly throughout the operating life of the storage system, so completion of the process may only refer to completion of processing the currently available or identified transaction log 410 to a specified progress point. Note that metadata streamer 424 may support parallel processing of more than one metadata operation of the same metadata operation type, such as multiple replication services, multiple notification services, multiple indexing services, etc.

Replication metadata operations may include a metadata operation of storage application 150 configured to selectively replicate new or updated data objects to a target object data store (in another fault domain) responsive to new write operations and/or object identifiers appearing in transaction log 410. Notification metadata operations may include a metadata operation of storage application 150 that monitors entries in transaction log 410 for specific entry criteria and provides notification to another system or service through a message broker, such as Apache Kafka. For example, each time an object is written with a desired data type or other parameters of interest, a message may be sent to the message broker for notifying a processing routine related to the data type (that can then count, read, update, or otherwise initiate further processing of the new data object). Indexing metadata operations may include a metadata operation of storage application 150 that builds specialized index data structures for accessing and managing data objects in object storage 140 and may selectively add index entries based on transaction log entries meeting relevant parameter criteria for the index. Parameter collection metadata operations may include a metadata operation of storage application 150 that increments one or more storage system parameters, such as object count, total storage, object size distributions, etc., for the storage system and/or one or more logical subunits thereof (such as buckets, users, accounts, etc.) and processes entries that represent data object changes relevant to the specific parameter or parameters being calculated. Maintenance operations, such as garbage collection and data scrub, may also rely on processing transaction log 410 and benefit from parallel processing with other metadata operations.

Figure 5:
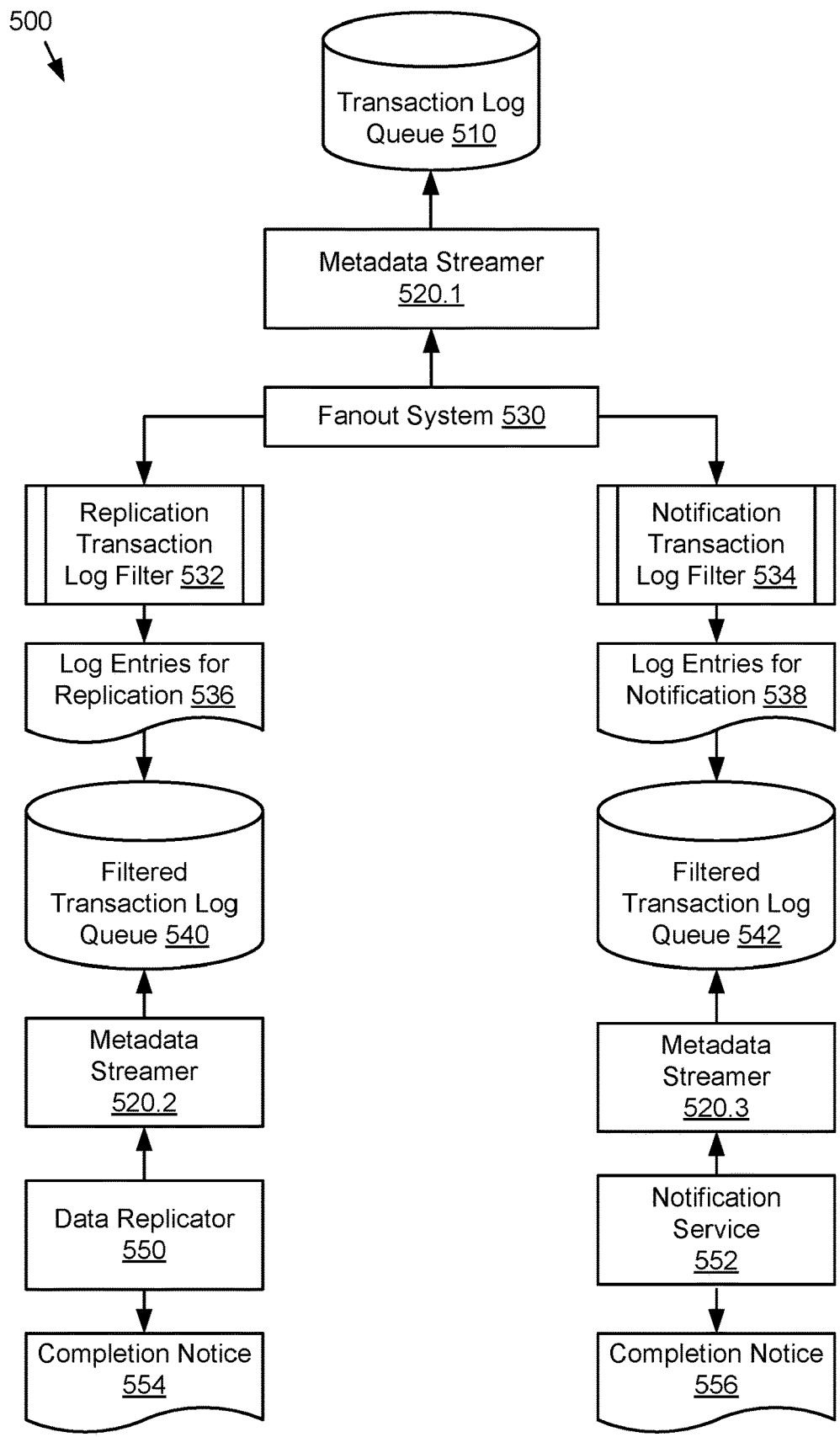
FIG. 5 is a block diagram of an example system for filtering transaction logs for use in parallel metadata operations.

FIG. 5 shows an example system 500 for filtering transaction logs for use in parallel metadata operations, which may use the components described above with regard to FIGS. 1-4. A transaction log queue 510 may be generated as a distributed queue by the key data store as new operations are processed by the storage manager and added as metadata entries. A primary metadata streamer 520.1 may fetch transaction logs from the distributed queue. Fanout system 530, which may include fanout sockets to support multiple pluggable log filters (two in the example shown), may request transaction logs from primary metadata streamer 520.1 and push transaction logs to the respective transaction log filters. Fanout system 530 may replicate transaction log queue 510 for each transaction log filter 532, 534 and/or may track log entries pushed to each transaction log filter using pointers, such as a progress pointer for each transaction log filter.

Replication transaction log filter 532 may include filtering criteria configured for selecting operations indicating data objects in need of replication. Notification transaction log filter 534 may include filtering criteria configured for selecting operations triggering notification to one or more other processes, services, or applications. Replication transaction log filter 532 may operate on the transaction logs fetched by primary metadata streamer 520.1 to generate a subset of transaction log entries for replication 536 and store them to filtered transaction log queue 540 as a distributed queue. Notification transaction log filter 534 may operate on the transaction logs fetched by primary metadata streamer 520.1 to generate another subset of transaction log entries for notification 538 and store them to filtered transaction log queue 542 as a distributed queue.

Metadata streamer 520.2 may be configured to fetch transaction logs only from filtered transaction log queue 540 for data replicator 550 and metadata streamer 520.3 may be configured to fetch transaction logs only from filtered log queue 542 for notification service 552. Data replicator 550 may be a metadata operation configured to replicate data objects based on the received transaction log entries and may request transaction logs from metadata streamer 520.2 as it has space available in its replication queue for processing by one or more replication engines. Notification service 552 may be a metadata operation configured to generate notification messages to one or more listeners based on the received transaction log entries and may request transaction logs from metadata streamer 520.2 as it has space in its message processing queue. In some embodiments, data replicator 550 and notification service 552 may each generate completion notices periodically as one or more transaction log entries or sets of transaction log entries are processed. System 500 may allow data replicator 550 and notification service 552 to operate in parallel but independently on transaction log queue 510, selectively processing only a filtered subset of the total transaction log entries in transaction log queue 510.

The methods of FIGS. 6-9 are now described. With reference to these methods, each of the operations shown and/or described may correspond to instructions stored in a computer memory or computer-readable storage medium, a customized logic chip, or other suitable implementation as discussed elsewhere herein. For example, the methods of FIGS. 6-9 may be implemented in a distributed storage system, such as DSS 1 in FIG. 1, using a computer system, such as computing system 400 in FIG. 4, with a storage application, such as storage application 150, executing the various methods as functions or operations within the storage application.

Figure 6:
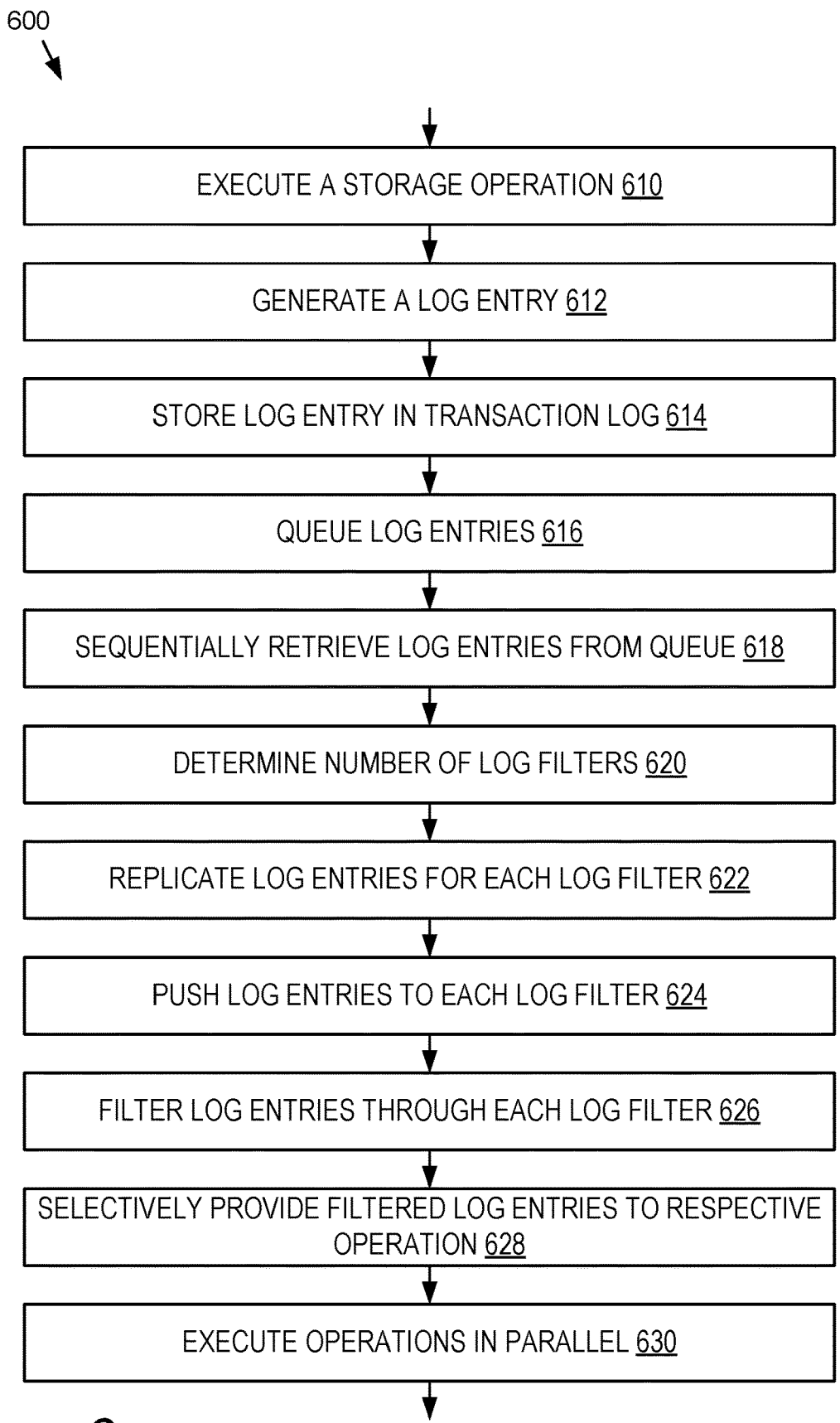
FIG. 6 is a flow chart of an example method for executing parallel metadata operations.

FIG. 6 is a flow chart of an example method 600 for executing parallel metadata operations using filtered transaction logs. For example, storage application 150 may execute steps 610-630 of FIG. 6 using key data store 130.

At block 610, a storage operation may be executed. For example, storage service 422 may execute a read, write, delete, or similar storage operation targeting a data object in object storage 140.

At block 612, a log entry may be generated. For example, key data store controller 420 may generate an operation log entry with a key value based on the target object, timestamp, and operation type.

At block 614, the log entry may be stored in a transaction log. For example, key data store controller 420 may store the generated log entry in transaction log 410 in key data store 130.

At block 616, log entries, including the log entry generated from the storage operation may be queued. For example, key data store controller 420 may queue log entries as they are stored in transaction log 410 in a distributed queue.

At block 618, log entries may be sequentially retrieved from the queue. For example, metadata streamer 424 may retrieve log entries from the distributed queue in the order they are added to the queue, such as timestamp order.

At block 620, a number of log filters may be determined. For example, metadata streamer 424 may support multiple parallel log filtering paths dedicated to different metadata operations and the number of plugged in log filters may be determined.

At block 622, log entries may be replicated for each log filter. For example, metadata streamer 424 may include replicator 430 to support the number of log filters determined at block 620.

At block 624, a set of log entries may be pushed to each log filter. For example, each log filter 432 may receive a redundant set of log entries from replicator 430.

At block 626, log entries may be filtered through each log filter. For example, each log filter 432 may process the received set of log entries according to unique filtering criteria to generate filtered log subsets.

At block 628, the filtered log entries are selectively provided to respective metadata operations. For example, each log filter 432 may be matched to a metadata operation 440 and each metadata operation 440 may receive the filtered log subsets from the matched log filter.

At block 630, the metadata operations are executed in parallel. For example, each metadata operation 440 may operate in parallel and independently on the filtered log subsets received from the log filters.

Figure 7:
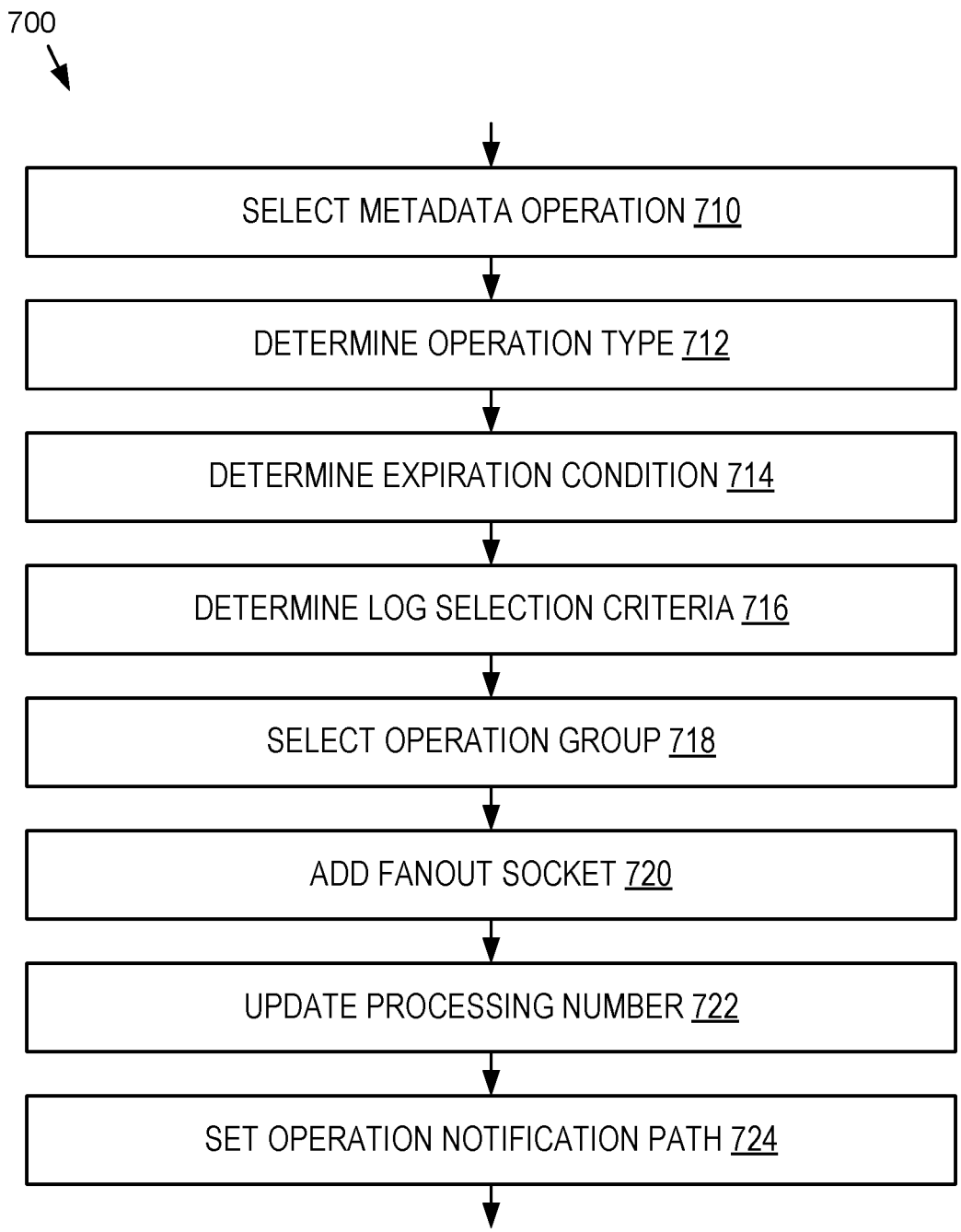
FIG. 7 is a flowchart of an example method for configuring a parallel transaction log filter.

FIG. 7 is a flow chart of an example method 700 for configuring a parallel transaction log filter. For example, storage application 150 may execute steps 710-724 of FIG. 7 using fanout sockets 428. In some embodiments, a log filter may be automatically generated when a metadata operation is configured and/or a user may manually configure a log filter through a user interface, such as through defining log filter parameters and storing them in a log filter file, table, or similar data structure.

At block 710, a metadata operation may be selected. For example, fanout sockets 428 may select a target metadata operation from metadata operations 440 to configure a log filter for.

At block 712, an operation type may be determined. For example, fanout sockets 428 may identify a metadata operation type, such as replication, notification, metadata indexing, parameter calculation, etc., for the target metadata operation.

At block 714, an expiration condition may be determined. For example, fanout sockets 428 may define one or more expiration conditions for log entries sent to the target metadata operation to determine when sets of operation log entries may be released.

At block 716, log selection criteria may be determined. For example, fanout sockets 428 may define a set of selection criteria based on parameters in the transaction log entries, such as one or more queries or similar sets of logical conditions for selecting log entries of interest for the target metadata operation.

At block 718, an operation group may be selected. For example, the target metadata operation may belong to an operation group with dependent and/or synchronized operations and fanout sockets 428 may optionally assign an operation group, if applicable.

At block 720, a fanout socket may be added for the log filter. For example, fanout sockets 428 defining the log filter parameters above may store a unique log filter record in a log filter definition file, table, or other data structure.

At block 722, a processing number may be updated. For example, fanout sockets 428 may maintain a number of active log filters and increase the processing number to reflect the new log filter plugged into the corresponding fanout socket.

At block 724, an operation notification path may be set. For example, metadata streamer 424 may register as a recipient of completion notifications from the target metadata operation and determine which metadata streamer instances should be notified upon receipt of completion notification to release log entries.

Figure 8:
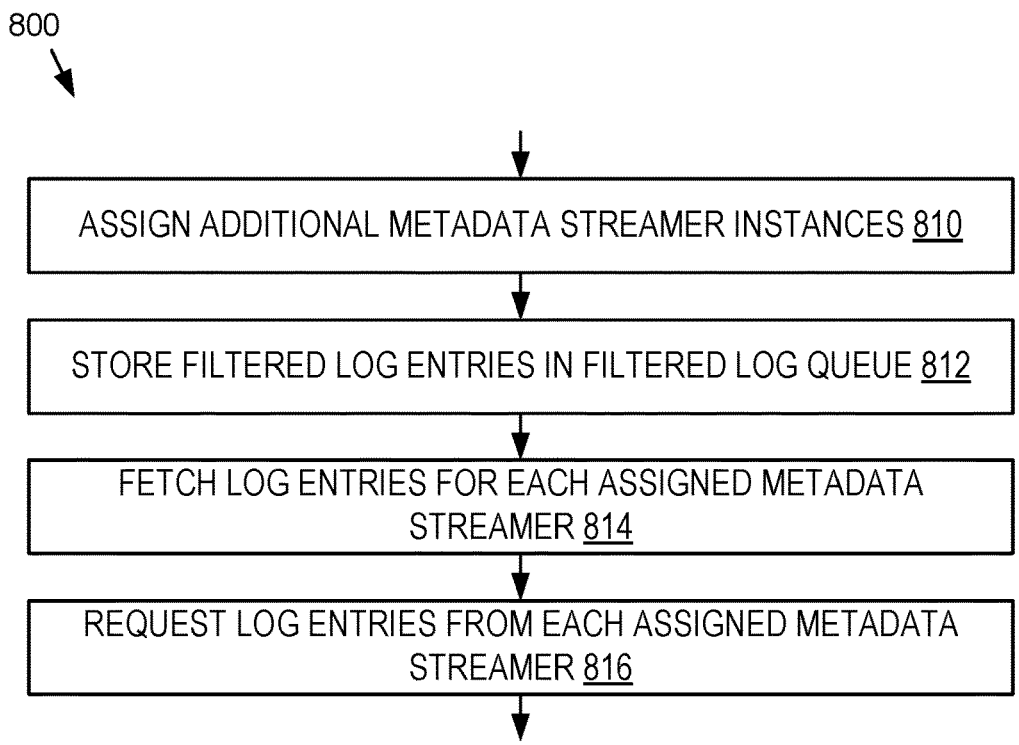
FIG. 8 is a flowchart of an example method for operating parallel metadata streamer instances.

FIG. 8 is a flow chart of an example method 800 for operating parallel metadata streamer instances. For example, storage application 150 may execute steps 810-816 of FIG. 8 using metadata streamer 424. In some embodiments, method 800 assumes a primary instance of the metadata streamer is configured to receive log entries from the distributed queue generated by key data store controller 420 and may be integrated into method 600 in FIG. 6 to support block 628.

At block 810, additional metadata streamer instances may be assigned to each metadata operation. For example, metadata streamer 424 may assign each additional metadata streamer instance (after the primary instance) to a dedicated fanout socket, log filter, and consumer metadata operation.

At block 812, filtered log entries may be stored in filtered log queues for each additional metadata streamer instance. For example, fanout sockets 428 may store filtered log entries 412 in distributed queues corresponding to each log filter/metadata streamer/metadata operation combination.

At block 814, log entries for each assigned metadata streamer may be fetched. For example, each additional metadata streamer instance 434 may fetch log entries as needed from the corresponding filtered log queues.

At block 816, log entries may be requested from each assigned metadata streamer. For example, each of metadata operations 440 may request log entries from their corresponding additional metadata streamer instance 434.

Figure 9:
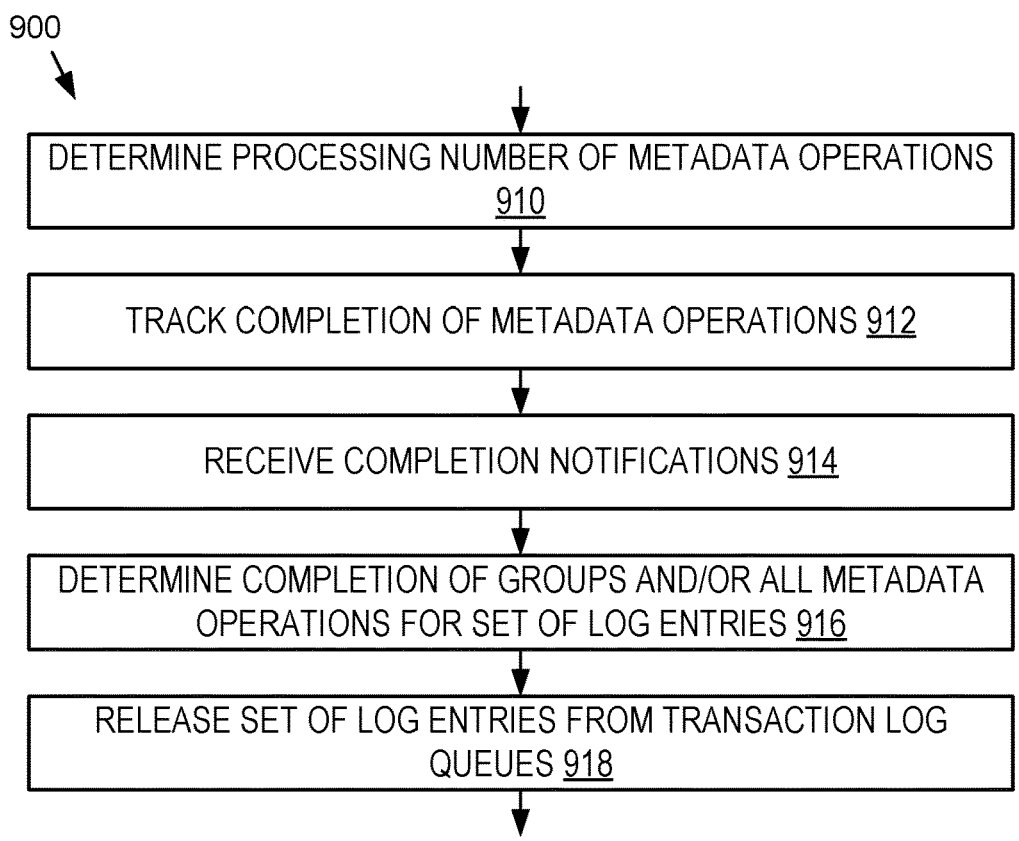
FIG. 9 is a flowchart of an example method for managing parallel metadata operations.

FIG. 9 is a flow chart of an example method 900 for managing parallel metadata operations. For example, storage application 150 may execute steps 910-918 of FIG. 9 using metadata streamer 424. In some embodiments, method 900 may be integrated into method 600 in FIG. 6 following block 630.

At block 910, a processing number of metadata operations may be determined. For example, reference counter 436 may determine the processing number from the number of active fanout sockets and/or registered metadata operations.

At block 912, completion of metadata operations may be tracked. For example, reference counter 436 may track open and active metadata operations until receiving notification of completion of metadata operations from the respective metadata operations.

At block 914, completion notification may be received. For example, reference counter 436 may receive completion notifications directly or through registration with metadata streamer 424.

At block 916, completion of groups and/or all metadata operations for a set of log entries may be determined. For example, reference counter 436 may manage release conditions on sequential sets of log entries queued through each transaction log set and related filtered subsets. In some embodiments, completion of a transaction log set may be based on all active metadata operations completing processing of the currently active transaction log set (based on their respective filtered log subsets). In some embodiments, completion of a transaction log set may be based on operation groups and managed separately for each such group, particularly synchronized operation groups.

At block 918, a set of completed log entries may be released from the transaction log queues. For example, reference counter 436 may determine that operations have completed for all concurrent metadata operations and/or an operations group and release the filtered subset of log transactions and/or set of transaction log entries.

To ease understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

Referring again to FIG. 4, in some embodiments, the key data store controller 420 may determine that the number of object keys stored in the ordered set of object key entries exceeds a predetermined threshold. The threshold may reflect the amount of storage space that can be acceptably utilized (e.g., a percentage of utilized storage space relative to a maximum). Responsive to such a determination, the key data store controller 420 may add an additional shard, in which case the key data store controller 420 may redistribute the object keys between the shards to help ensure that the object keys are more evenly spread between the database shards. In some cases, the key data store controller 420 may update a range table to accurately represent which object keys are stored on which database shards. In further embodiments, the key data store controller 420 may create new shards or re-shard the existing database shards for additional reasons including, but not limited to, improve performance of key data store 130, compliance to rules/laws/regulations, security policies, and/or load requirements of the key data store 130, and/or other suitable purposes.

The processor(s) 402 may execute software instructions by performing various input/output, logical, and/or mathematical operations. The processor(s) 402 may have various computing architectures to process data signals including, for example, a complex instruction set computer (CISC) architecture, a reduced instruction set computer (RISC) architecture, and/or an architecture implementing a combination of instruction sets. The processor(s) 402 may be physical and/or virtual, and may include a single processing unit and/or core or plurality of processing units and/or cores. In some implementations, the processor(s) 402 may be capable of generating and providing electronic display signals to a display device (not shown), supporting the display of images, capturing and transmitting images, performing complex tasks including various types of feature extraction and sampling, etc. In some embodiments, the processor(s) 402 may be coupled to the memor(ies) 404 via a communication bus 406 to access data and instructions therefrom and store data therein. The bus 406 may couple the processor(s) to the other components of the computing system 400, for example, memor(ies) 404, communication unit(s) 408, physical storage devices and/or storage systems (e.g., object storage 140, key data store 130).

The memor(ies) 404 may store and provide access to data to the other components of the computing system 400. The memor(ies) 404 may store instructions and/or data that may be executed by the processor(s) 402. For example, the memor(ies) 404 may store an instance of the storage application 150, software implementing the key data store 130, cached keys and objects, parameters, operating system(s), drivers, databases, and/or other software applications, etc. The memor(ies) 404 may be coupled to the bus 406 for communication with the processor(s) 402 and the other components of computing system 400.

The memor(ies) 404 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 402. In some embodiments, the memor(ies) 404 may include one or more of volatile memory and non-volatile memory (e.g., RAM, ROM, flash, solid state drive, hard drive, optical disc, tape, magnetic diskette, etc.). It should be understood that the memor(ies) 404 may include a single device or may include multiple types of devices and configurations.

The communication unit 408 may include one or more interface devices for wired and wireless communication with the network 70 and the other entities and/or components of the client architecture 50 including, for example, the client devices 60, storage system 80, object storage 140, etc. For instance, the communication unit 408 may include, but is not limited to, CAT-type interfaces; wireless transceivers for sending and receiving signals using Wi-Fi™; Bluetooth®, cellular communications, etc.; USB interfaces; various combinations thereof; etc. In some embodiments, the communication unit 408 can link the processor(s) 402 to the network 70, which may in turn be coupled to other processing systems. The communication unit 408 can provide other connections to the network 70 and to other entities of the system 400 using various communication protocols, including, for example, those discussed elsewhere, herein. In some instances, the communication unit 408 includes a wired port and a wireless transceiver. The communication unit 408 also provides other connections to the network 70 for distribution of files and/or media objects using various network protocols, such as those discussed elsewhere herein.

In some embodiments, the computing system 400 may include a software communication mechanism implemented via the network 70 and/or communication bus 406 that can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., secure shell (SSH), HTTPS, etc.).

In the above description, for purposes of explanation, numerous specific details are set forth to provide a thorough understanding of the various aspects of different example embodiments. It should be evident, however, that any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A storage system, comprising:
   at least one storage node configured to execute storage operations;
   a transaction log configured to store a plurality of log entries corresponding to storage operations for the at least one storage node;
   a first metadata streamer configured to sequentially retrieve a set of log entries from the transaction log; and
   a plurality of transaction log filters configured to selectively provide filtered subsets of the set of log entries from the first metadata streamer to a plurality of metadata operations, wherein:
      each transaction log filter of the plurality of transaction log filters corresponds to a different metadata operation of the plurality of metadata operations;
      each different metadata operation of the plurality of metadata operations is configured to process a different filtered subset of the set of log entries;
      the different metadata operations of the plurality of metadata operations are configured to operate in parallel on the different filtered subsets of the set of log entries;
      a first transaction log filter of the plurality of transaction log filters is configured with a first metadata operation type selected from a group of metadata operation types, the group including:
         replication;
         notification;
         metadata indexing;
         garbage collection;
         data scrub; and
         parameter calculation;
      a second transaction log filter of the plurality of transaction log filters is configured with a second metadata operation type selected from the group of metadata operation types;
      the first metadata operation type is different than the second metadata operation type;
      each metadata operation of the plurality of metadata operations is configured with an operation group;
      a selected operation group includes a plurality of synchronized metadata operations; and
      filtered subsets of the set of log entries are configured for release when each metadata operation for the selected operation group are all complete.

2. The storage system of claim 1, further comprising:
   a fanout socket configured to:
      receive the set of log entries from the first metadata streamer;
      replicate the set of log entries for each transaction log filter of the plurality of transaction log filters; and
      push a replicated set of log entries to each transaction log filter of the plurality of transaction log filters.

3. The storage system of claim 2, wherein:
   the fanout socket further includes an expandable interface for interfacing with a variable number of transaction log filters; and
   the plurality of transaction log filters includes at least three pluggable transaction log filters.

4. The storage system of claim 1, further comprising:
   a plurality of filtered transaction logs configured to temporarily store the filtered subsets of the set of log entries from the plurality of transaction log filters, wherein each transaction log filter of the plurality of transaction log filters corresponds to an assigned filtered transaction log from the plurality of filtered transaction logs.

5. The storage system of claim 4, further comprising:
   a plurality of additional metadata streamers configured to fetch log entries from the plurality of filtered transaction logs, wherein each assigned filtered transaction log from the plurality of filtered transaction logs corresponds to an assigned metadata streamer from the plurality of additional metadata streamers.

6. The storage system of claim 1, wherein:
   the first transaction log filter is configured with a first log entry selection criterion;
   the second transaction log filter is configured with a second log entry selection criterion; and
   the first log entry selection criterion and the second log entry selection criterion are different.

7. The storage system of claim 1, further comprising:
   a reference counter configured to:
      track a processing number of metadata operations corresponding to the plurality of metadata operations; and
      release, responsive to completing the plurality of metadata operations, the filtered subsets of the set of log entries from the first metadata streamer.

8. The storage system of claim 7, wherein the reference counter is further configured to receive a completion notification from each metadata operation of the plurality of metadata operations.

9. The storage system of claim 1, wherein each transaction log filter of the plurality of transaction log filters includes:
   an operation type;
   an expiration condition; and
   at least one log entry selection criteria.

10. A computer-implemented method, comprising:
- storing a transaction log comprised of a plurality of log entries corresponding to storage operations for at least one storage node;
- sequentially retrieving a set of log entries from the transaction log;
- selectively providing, using a first transaction log filter, a first filtered subset of the set of log entries to a first metadata operation, wherein the first metadata operation has a first metadata operation type selected from a group of metadata operation types, the group including:
  - replication;
  - notification;
  - metadata indexing;
  - garbage collection;
  - data scrub; and
  - parameter calculation;
- selectively providing, using a second transaction log filter, a second filtered subset of the set of log entries to a second metadata operation, wherein the second metadata operation has a second metadata operation type selected from the group of metadata operation types; and
- executing in parallel:
  - the first metadata operation on the first filtered subset of the set of log entries; and
  - the second metadata operation on the second filtered subset of the set of log entries,
  - wherein:
    - the first filtered subset is a different filtered subset from the second filtered subset;
    - the first metadata operation type is a different metadata operation type from the second metadata operation type;
    - the first metadata operation and the second metadata operation are in a selected operation group; and
    - the first filtered subset and the second filtered subset are released when each metadata operation for the selected operation group are all complete.

11. The computer-implemented method of claim 10, further comprising:
- replicating the set of log entries for:
  - the first transaction log filter; and
  - the second transaction log filter;
- pushing a first replicated set of log entries to the first transaction log filter; and
- pushing a second replicated set of log entries to the second transaction log filter.

12. The computer-implemented method of claim 10, further comprising:
- adding a third transaction log filter for a third metadata operation;
- selectively providing, using the third transaction log filter, a third filtered subset of the set of log entries to the third metadata operation; and
- executing, in parallel with the first metadata operation and the second metadata operation, the third metadata operation on the third filtered subset of the set of log entries.

13. The computer-implemented method of claim 10, further comprising:
- storing the first filtered subset of the set of log entries in a first filtered transaction log;
- storing the second filtered subset of the set of log entries in a second filtered transaction log;
- removing, responsive to completing the first metadata operation on the first filtered subset, the first filtered subset from the first filtered transaction log; and
- removing, responsive to completing the second metadata operation on the second filtered subset, the second filtered subset from the second filtered transaction log.

14. The computer-implemented method of claim 13, further comprising:
- fetching, using a first metadata streamer, log entries from the first filtered transaction log;
- fetching, using a second metadata streamer, log entries from the second filtered transaction log;
- requesting, by the first metadata operation, log entries from the first filtered transaction log; and
- requesting, by the second metadata operation, log entries from the second filtered transaction log.

15. The computer-implemented method of claim 10, further comprising:
- determining a first log entry selection criterion for the first transaction log filter; and
- determining a second log entry selection criterion for the second transaction log filter, wherein the first log entry selection criterion and the second log entry selection criterion are different.

16. The computer-implemented method of claim 10, further comprising:
- tracking a processing number of metadata operations for a plurality of metadata operations, wherein the plurality of metadata operations includes the first metadata operation and the second metadata operation; and
- releasing, responsive to the processing number of metadata operations completing, the set of log entries retrieved from the transaction log.

17. The computer-implemented method of claim 16, further comprising:
- receiving a completion notification from each metadata operation of the plurality of metadata operations; and
- determining, responsive to receiving the completion notification from each metadata operation of the plurality of metadata operations, the processing number of metadata operations are complete.

18. The computer-implemented method of claim 10, further comprising:
- determining a first expiration condition for the first transaction log filter;
- determining a second expiration condition for the second transaction log filter; and
- releasing, responsive to the first expiration condition and the second expiration condition being met, the set of log entries.

19. A system, comprising:
- at least one storage node configured to execute storage operations;
- a transaction log comprised of a plurality of log entries corresponding to storage operations for the at least one storage node;
- means for sequentially retrieving a set of log entries from the transaction log;
- means for selectively providing, using a first transaction log filter, a first filtered subset of the set of log entries to a first metadata operation, wherein the first metadata operation has a first metadata operation type selected from a group of metadata operation types, the group including:
  - replication;
  - notification;
  - metadata indexing;

garbage collection;
data scrub; and
parameter calculation;
means for selectively providing, using a second transaction log filter, a second filtered subset of the set of log entries to a second metadata operation, wherein the second metadata operation has a second metadata operation type selected from the group of metadata operation types;
and
means for executing in parallel:
  the first metadata operation on the first filtered subset of the set of log entries; and
  the second metadata operation on the second filtered subset of the set of log entries, wherein:
    the first filtered subset is a different filtered subset from the second filtered subset;
    the first metadata operation type is a different metadata operation type from the second metadata operation type;
    the first metadata operation and the second metadata operation are in a selected operation group; and
    the first filtered subset and the second filtered subset are released when each metadata operation for the selected operation group are all complete.

* * * * *